(12) United States Patent
Stenbeck et al.

(10) Patent No.: US 10,018,192 B2
(45) Date of Patent: Jul. 10, 2018

(54) PISTON PUMP ARRANGEMENT FOR HYGIENIC PROCESSING APPLICATIONS

(71) Applicant: Tetra Laval Holdings & Finance S.A., Pully (CH)

(72) Inventors: Johan Stenbeck, Malmo (SE); Fredrik Johansson, Lund (SE); Isac Salman, Malmo (SE); Jenny Jonsson, Lund (SE); Rikard Hansson, Eslov (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 398 days.

(21) Appl. No.: 14/653,978

(22) PCT Filed: Dec. 17, 2013

(86) PCT No.: PCT/EP2013/076944
§ 371 (c)(1),
(2) Date: Jun. 19, 2015

(87) PCT Pub. No.: WO2014/095896
PCT Pub. Date: Jun. 26, 2014

(65) Prior Publication Data
US 2015/0354554 A1 Dec. 10, 2015

(30) Foreign Application Priority Data
Dec. 21, 2012 (SE) ...................... 1251496

(51) Int. Cl.
*F01B 19/02* (2006.01)
*F04B 43/06* (2006.01)
(Continued)

(52) U.S. Cl.
CPC ............ *F04B 43/06* (2013.01); *F04B 43/009* (2013.01); *F04B 43/025* (2013.01); *F04B 43/067* (2013.01); *F16J 3/02* (2013.01)

(58) Field of Classification Search
CPC ....... F16J 3/02; F04B 43/0054; F04B 43/009; F04B 43/067; F04B 43/025
(Continued)

(56) References Cited

U.S. PATENT DOCUMENTS 3,605,566 A * 9/1971 Vetter .................. F04B 43/009
                                                              92/97
4,971,523 A    11/1990 Wacker et al.
(Continued)

FOREIGN PATENT DOCUMENTS

DE    1403804 A1    12/1968
DE    2624129 A1     3/1977
EP    0359556 A1     3/1990

OTHER PUBLICATIONS

International Search Report (PCT/ISA/210) dated Apr. 14, 2014, by the European Patent Office as the International Searching Authority for International Application No. PCT/EP2013/076944.

*Primary Examiner* — Michael Leslie
(74) *Attorney, Agent, or Firm* — Buchanan Ingersoll & Rooney PC (57) ABSTRACT

A membrane arrangement to be placed between a product chamber and a hydraulic oil chamber is provided. The membrane arrangement comprises a first membrane and a second membrane. Between the membranes in a membrane interior space a marker liquid is placed. By using a sensor it can be detected when product or hydraulic oil enters the membrane interior space, which in turn means that a rupture of any of the two membranes may be detected in a reliable and cost efficient way.

16 Claims, 10 Drawing Sheets

(51) Int. Cl.
   *F04B 43/02*   (2006.01)
   *F16J 3/02*    (2006.01)
   *F04B 43/00*   (2006.01)
   *F04B 43/067*  (2006.01)

(58) Field of Classification Search
   USPC .................................. 92/97, 103, 103 R
   See application file for complete search history.

(56) References Cited

U.S. PATENT DOCUMENTS

| | | | | |
|---|---|---|---|---|
| 6,138,550 A | * | 10/2000 | Fingar, Jr. ........... | F04B 43/0054 92/103 R |
| 2012/0011998 A1 | * | 1/2012 | Johansson ............. | F04B 43/067 92/47 |

* cited by examiner

PISTON PUMP ARRANGEMENT FOR HYGIENIC PROCESSING APPLICATIONS

TECHNICAL FIELD

The invention generally relates to the processing industry. More particularly, the invention relates to a piston pump arrangement suitable for hygienic applications, such as food processing, cosmetic product processing or pharmaceutical product processing.

BACKGROUND OF THE INVENTION

Today it is well known to use homogenizers within the food processing industry. For instance, within the dairy industry homogenizers are used for dividing fat globules into minor parts in order to obtain a stable fat emulsion against gravity separation. In other words, by homogenizing milk one can avoid that a cream layer is formed on top of the milk product. Other reasons for homogenizing food products are to achieve a more appetizing colour, reduced sensitivity of fat oxidation, more full bodied flavor, improved mouth-feel and better stability of cultured milk products.

Generally a homogenizer can be divided in two main parts, a high pressure pump forming a high pressure and a homogenizing device providing a gap through which the product is forced. Today, most often the high pressure pump is a piston pump with three to five pistons. In order to make sure that unwanted microorganisms are not spread to the product when the pistons are moving back and forth piston seals are used. A common approach is to have at least two piston seals placed apart from each other such that a barrier can be formed between the product, placed on a so-called hygienic side, and non-hygienic parts of the homogenizer, such as crankcase and crankshaft using hydraulic oil, placed on a so-called non-hygienic side.

For example, in non-aseptic homogenizers, i.e. homogenizers placed upstream a heat treatment station, a common approach is to have double piston seals with water provided between the seals to lubricate the pistons. In aseptic homogenizers, i.e. homogenizers placed downstream a heat treatment station, a mixture of hot condensate and steam may be supplied between the seals in order to prevent re-infection.

The homogenizer and the homogenizing process are further described in "Dairy Processing Handbook" published by Tetra Pak, hereby incorporated by reference.

Since it is difficult to keep the hygienic side and the non-hygienic side apart when the pistons are moving back and forth some food producers have decided to use only food graded oils as a precautionary measure. By doing so they reduce the risk of causing health issues, but if the oil finds its way to the product the product properties are nevertheless negatively affected.

For the above mentioned reasons, it is today requested from food producers to make sure that the oil does not end up with the product in order to avoid health issues and product losses.

Further, apart from reducing the risk that oil does not end up with the product it is important that the technical solution is cost efficient both from capital expenditure perspective and operational performance expenditure. In other words, the technical solution should require a reasonable investment cost for the food producer and when running the technical solution the need for utilities should be kept at a low level, and providing service should be possible without increasing operational costs significantly.

SUMMARY

Accordingly, the present invention preferably seeks to mitigate, alleviate or eliminate one or more of the above-identified deficiencies in the art and disadvantages singly or in any combination and solves at least the above mentioned problems.

According to a first aspect it is provided a membrane arrangement comprising a first membrane and a second membrane, wherein a marker liquid is placed in a membrane interior space formed between said first membrane and said second membrane.

The membrane arrangement may comprise of two individual membranes, but also a unit comprising two membranes connected by a membrane ring.

The marker liquid should be interpreted broadly as any liquid, gel or other material that is able to forward a pressure from a piston to a product chamber and that changes one or more properties when hydraulic oil or product mixes with the marker liquid.

The marker liquid may be a conductive solution. More particularly, a conductivity of said conductive solution may be different from a conductivity of the product, and different from a conductivity of the hydraulic oil.

The conductive solution may be salt water. More particularly, the conductive solution may be salt water with 2% salt content.

The membrane arrangement may further comprise a membrane ring connecting said first membrane and said second membrane to each other such that said membrane interior space is formed, wherein said membrane interior space is configured to hold said marker liquid.

More particularly, the membrane interior space may be a closed space.

The membrane arrangement may further comprise a sampling opening in said membrane ring.

Further, it may be provided a sensor configured to register at least one property of said marker liquid.

The sensor may be configured to register conductivity.

The sensor may be placed in said membrane interior space.

More particularly, the second membrane may comprise a main body having a first side and a second side, wherein said main body is made of an elastic material, wherein said second side is provided with a plastic coating. The second side of the second membrane may be facing said product chamber.

The elastic material may be rubber.

The rubber may be ethylenepropylenedienemonomer (EPDM).

The plastic coating may be polytetrafluoroethylene (PTFE).

According to a second aspect it is provided a piston pump arrangement comprising a membrane arrangement according to the first aspect.

The piston pump arrangement may further comprise a pressure relief valve connected to a hydraulic oil chamber.

According to a third aspect it is provided a processing line comprising a piston pump arrangement according to the second aspect.

The processing line may be a food processing line.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein.

DETAILED DESCRIPTION OF PREFERRED EMBODIMENTS

Figure 1:
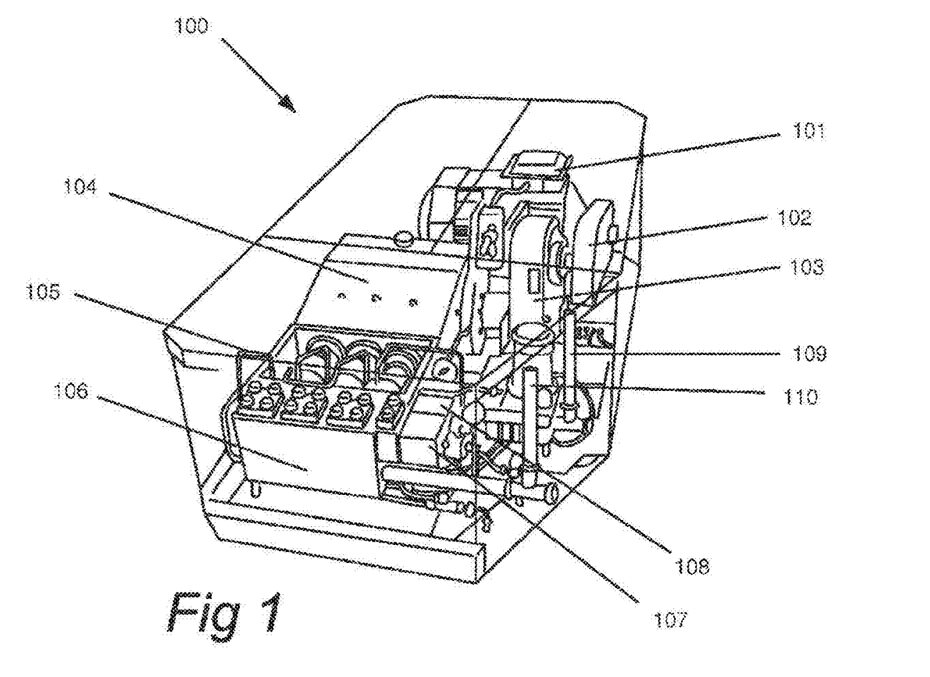
FIG. 1 schematically illustrates a homogenizer.

FIG. 1 generally illustrates a homogenizer 100, more particularly a homogenizer sold under the name Tetra Alex™ by Tetra Pak. Generally, the homogenizer 100 comprises two main parts, a high pressure pump and a homogenising device. The high pressure pump forms a high pressure and the homogenising device provides one or several gaps through which the product is forced with the effect that smaller fat globules are formed. Further effects of homogenization is more appetizing colour, reduced sensitivity to fat oxidation, more full-bodied flavour and better stability of cultured milk products.

In this example, the high pressure pump is a piston pump driven by a main drive motor 101 connected via a belt transmission 102 and a gearbox 103 to a crankshaft placed in a crankcase 104. By using the crankshaft the rotary motion is converted to a reciprocating motion driving pump pistons 105 back and forth. Today, it is common to have three to five pump pistons.

The pump pistons 105 run in cavities formed in a pump block 106 made to withstand the high pressure created by the pump pistons. Today it is common to increase the pressure from 300 kPa (3 bar) to about 10-25 MPa (100-250 bar), but higher pressures can be used as well.

Through cavities in the pump block 106 the product enters a first homogenizing device 107 and thereafter, in many cases, a second homogenizing device 108. As described above, by forcing the product through one or several gaps the properties of the product can be changed.

The reciprocating motion of the pump pistons 105 creates pulsations. To reduce the pulsations it is common practice today to place an inlet damper 109 on an inlet of the homogenizer. Further, in order to reduce vibrations and noise it is common practice to place an outlet damper 110 on an outlet.

Figure 2:
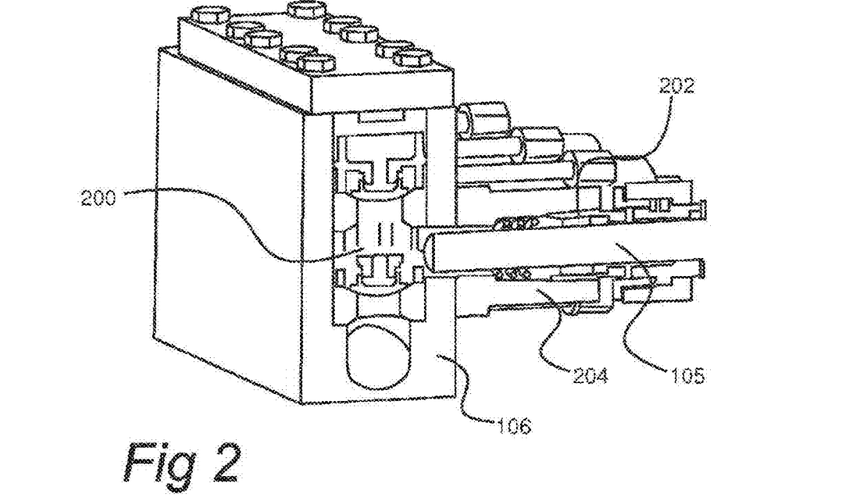
FIG. 2 schematically illustrates a so-called wet end of the homogenizer of FIG. 1.

FIG. 2 illustrates a so-called wet end of the homogenizer in greater detail. As can be seen in this cross sectional view, the piston 105 is moving back and forth such that a high pressure is formed in a product chamber 200 in the pump block 106. One or several seals 202 are used for keeping a tight fitting between the piston 105 and a piston receiving element 204. The one or several seals 202 also keep the product in the product chamber 200 apart from the crankcase and other non-hygienic parts of the homogenizer. In order to further make sure that unwanted microorganisms do not end up in the product it is a common approach today to use steam barriers or the like in combination with the piston seals 202.

Figure 3:
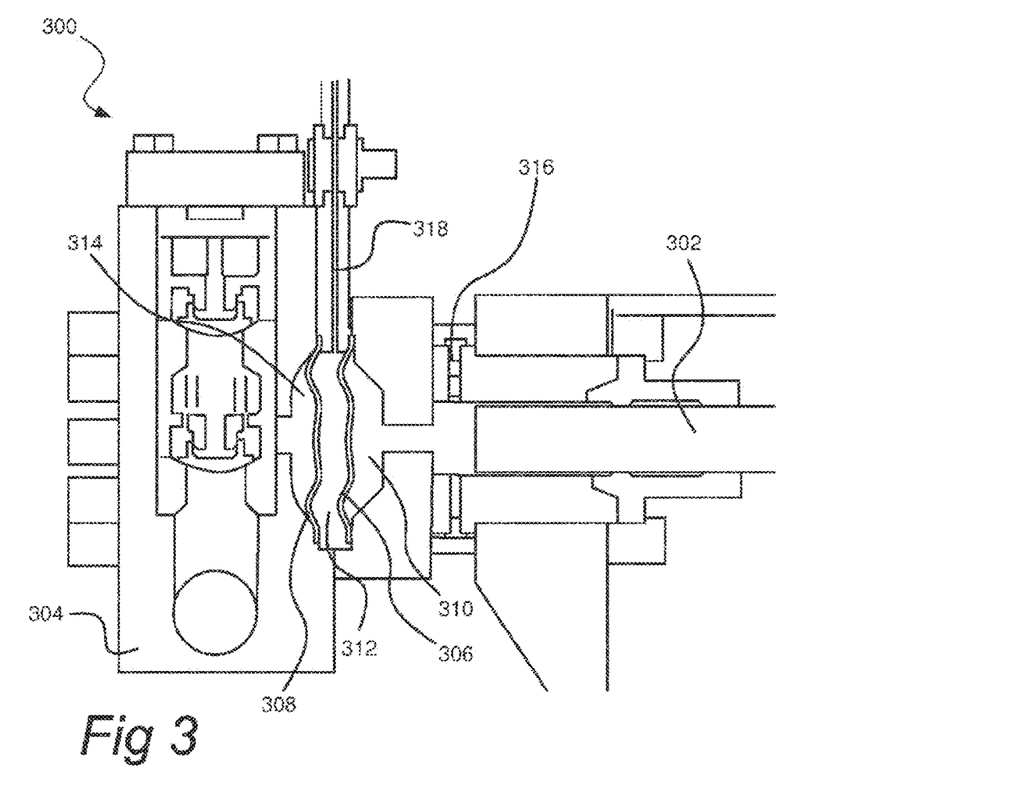
FIG. 3 schematically illustrates a wet end in a membrane equipped homogenizer.

In FIG. 3 a wet end 300 of a membrane equipped homogenizer is illustrated. As the homogenizer illustrated in FIGS. 1 and 2, the homogenizer is provided with a piston 302, or more correctly a number of pistons, although only one of them is illustrated in this cross sectional view. Further, the piston 302 is forming a high pressure in a pump block 304.

Unlike the homogenizer illustrated in FIGS. 1 and 2, the wet end 300 is provided with a first membrane 306 and a second membrane 308. The first membrane 306 can be arranged such that a hydraulic oil chamber 310 and a membrane interior space 312, that is, a space formed between the first membrane 306 and the second membrane 308, is kept apart. The second membrane 308 can be arranged such that the membrane interior space 312 and a product chamber 314 are kept apart.

Figure 11:
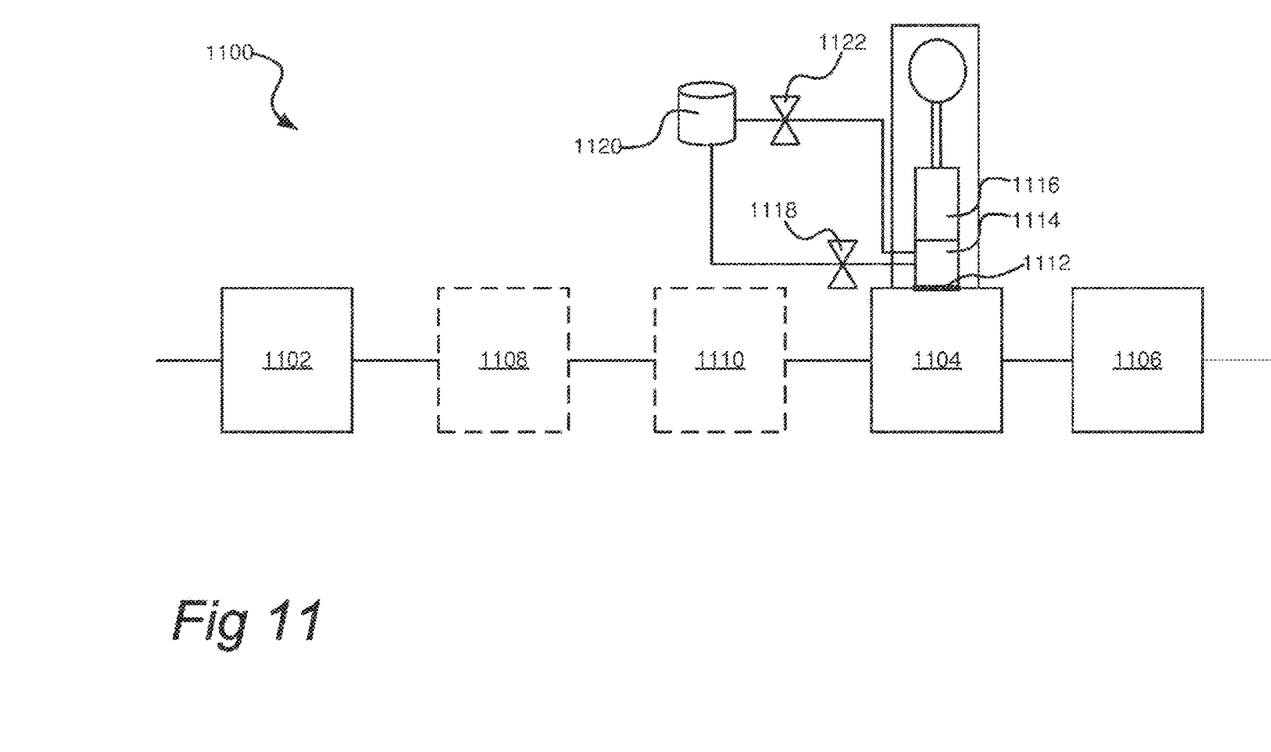
FIG. 11 schematically illustrates a food processing system with a membrane equipped homogenizer provided with a pressure relief valve.

Further, a high pressure relief valve 316 can be connected to the hydraulic oil chamber 310 such that a pressure in the hydraulic oil chamber can be lowered by opening this valve. Although not illustrated, when opening the high pressure relief valve 316 hydraulic oil may be fed into a tank. This tank may also be connected to an inlet in the hydraulic oil chamber via an inlet valve such that hydraulic oil can be fed into the hydraulic oil chamber at a later stage. A positive effect of this set up is that the hydraulic oil released via the high pressure relief valve 316 can be re-used. An example set up is illustrated in FIG. 11.

The reason for having hydraulic oil is that this is used for forwarding the pressure formed by the piston 302 via the first membrane 306 and the second membrane 308 to the product chamber 314, but also for lubricating the seals and in that way extend the life time of the seals. Hence, unlike the wet end illustrated in FIG. 2, the piston is indirectly forming a pressure in the product chamber 314.

An advantage of having membranes separating the product chamber 314 from the piston 302, crankshaft, crankcase and other parts placed on the non-hygienic side is that a well defined border is formed. An effect of this is that the risk that unwanted microorganisms pass the membranes into the product chamber 314 is significantly lowered. Even if the same degree of food safety may be achieved using for instance steam barriers, the membranes solution has the benefit that no steam barriers are needed. The effect of this in turn is that the operational costs for running the homogenizer can be significantly reduced. Also from an environmental perspective, using less steam is of significant value.

A risk with membrane equipped homogenizers is that the membranes break and that hydraulic oil enters the product chamber. This may be a food safety hazard depending on the hydraulic oil being used, but it will with a high likelihood result in product losses. In order to overcome this risk, in the membrane interior space 312, that is, the space formed between the first membrane 306 and the second membrane 308, a marker liquid may be present. The aim of the marker liquid is to make it possible to detect a membrane rupture in a reliable, fast and cost efficient way.

The marker liquid can be a liquid, such as salt water, but it can also be a gel or any other material capable of forwarding a pressure and changing properties, such as conductivity, when mixed with a hydraulic oil or a product.

One way of detecting a membrane rupture is to have a conductive solution, such as a salt water, as marker liquid and to have a conductivity sensor continuously measuring conductivity of the marker liquid. If the first membrane 306 breaks, hydraulic oil will enter the membrane interior space 310 and mix with the marker liquid with the result that the conductivity is changed, provided of course that a hydraulic oil with different conductivity than the conductive solution has been chosen. On the other hand, if the second membrane 308 breaks product will enter the membrane interior space 312 and mix with the conductive solution. Provided that the product has a different conductivity than the conductive solution the conductivity will be altered. Hence, by having a conductive solution in the membrane interior space 312 it can be detected when both the first membrane 306 and the second membrane 308 breaks.

As an alternative to having the conductive solution, a non-conductive solution can be used, or if difficult to find a non-conductive liquid, at least a solution with low conductivity. If having the non-conductive solution, such as deionized water, the conductivity will increase if the first membrane 306 or the second membrane 308 break, provided of course that the product and the hydraulic oil both have a higher conductivity than the non-conductive solution.

In the set up exemplified in FIG. 3 it is provided a sample channel 318. By having the sample channel 318 a sample from the membrane interior space 312 may be taken and analyzed by a conductity sensor placed outside the membrane interior space 312. One reason for not placing a conductivity sensor in the membrane interior space 312 is the high pressure. However, if having a conductivity sensor withstanding the high pressure the conductivity sensor may be placed in the membrane interior space.

Instead of measuring conductivity, or as a complement thereto, other parameters may be used, for instance turbidity. By having for instance a marker liquid with a turbidity different from a turbidity of the hydraulic oil and the product, turbidity will change in case of leakage due to membrane rupture. This turbidity change can be detected by a turbidity sensor.

Yet another example is to have a marker liquid with light transmitting properties different from both the hydraulic oil and the product. With a light registering sensor possibly combined with a light emitting device, such that absorbed light or reflected light can be measured, it can be detected whether any of the membranes has broken and hydraulic oil or product have entered the membrane interior space.

Apart from the advantage that a marker liquid can be held between two membranes, the first membrane 306 and the second membrane 308, it is an advantage of having two membranes since the risk that both membranes should break at the same time is very low and hence also the risk that hydraulic oil enters the product.

Figure 4:
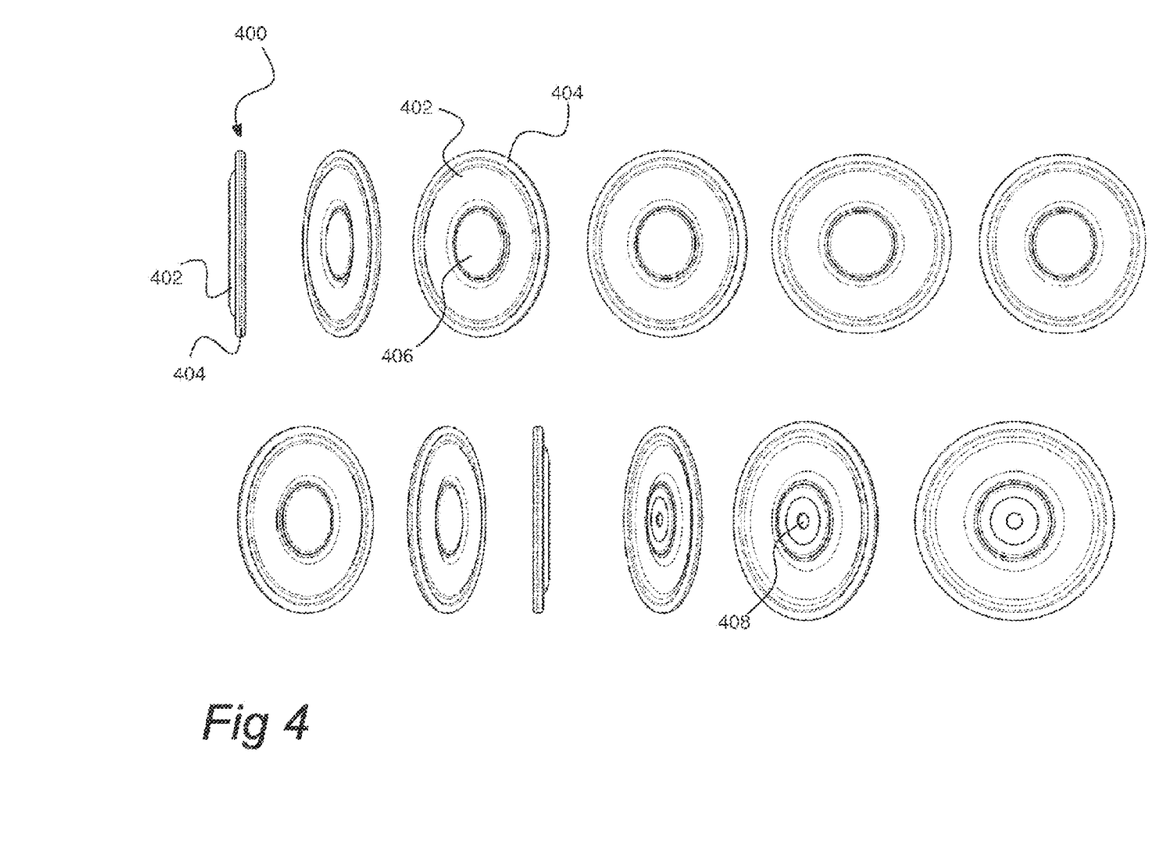
FIG. 4 illustrates a number of different perspective views on a membrane.

FIG. 4 illustrates a number of different perspective views of a membrane 400 that can be used as the first membrane 306 or the second membrane 308 in the wet end illustrated in FIG. 3.

Figure 5A:
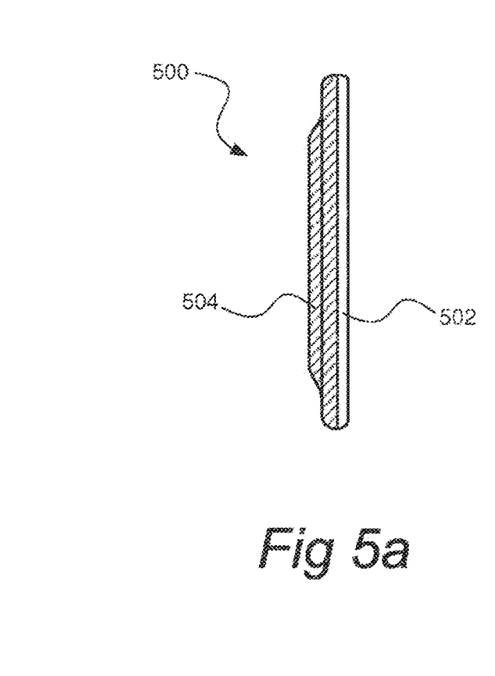
FIGS. 5a and 5b illustrate a membrane in a first mode and a second mode.
Figure 5B:
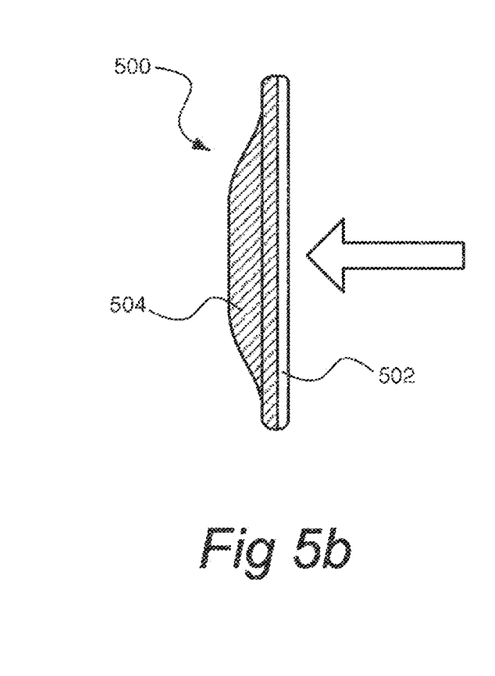

In order to receive the force created by the piston in a way such that the membrane 400 is not worn out only after a short period of time, the membrane 400 may be provided with a raised section 402 placed between a periphery 404 of the membrane and a mid section 406 making sure that the membrane can flex between a first mode, illustrated in FIG. 5a, and a second mode, illustrated in FIG. 5b, without wearing out the material of the membrane. Further, an advantage of having the raised section may also be greater volume difference between the first mode and the second mode.

The mid section 406 may be strengthened by a strengthening portion 408, e.g. a metal portion incorporated in the membrane, in order to avoid so-called "coining", i.e. the membrane breaks such that a small portion of the mid section in the shape of a coin is torn from the membrane.

In FIG. 5a the membrane is in the first mode in which no force is exerted on the membrane, neither on a product chamber side (left side in FIGS. 5a and 5b), nor on a hydraulic oil chamber side (right side in FIGS. 5a and 5b).

In FIG. 5b the membrane is in the second mode in which a force is exerted on the hydraulic oil chamber side such that the mid section of the membrane is pushed towards the product chamber side.

In order to make sure that the membrane can be cleaned properly and efficiently the product chamber side of the membrane is preferably provided with properties such that food residues can be easily removed. Further, the product chamber side should also be able to withstand chemicals used when cleaning, e.g. lye and acid. The hydraulic oil chamber side should on the other hand preferably have properties suited to work well with the hydraulic oil. The membrane as a whole should be elastic such that the pressure formed by the piston can be forwarded to the product chamber without wearing out the membrane. Further, the membrane should also be elastic such that the membrane can be small, e.g. a diameter of 10-30 cm. A small membrane namely has the effect that the pump block can be made small, in turn implying that less material, e.g. stainless steel, is needed, which directly effect the investment cost for the food producer.

Returning to FIGS. 5a and 5b, it is illustrated a membrane 500 comprising a main body 502 made of a rubber material, such as an elastomer. In one particular example the elastomer ethylenepropylenedienemonomer (EPDM) has been chosen, but since the choice of material depends on the hydraulic oil used other material can be chosen as well. Using a rubber material, such as an elastomer, for the main body, makes it possible to reduce the size of the membrane to about 10-30 cm or lower while still being able to forward the pressure from the piston satisfactorily.

In order to provide for that the product chamber side can be cleaned properly a coating 504 may be provided on this side. The coating 504 may be made of polytetrafluoroethylene (PTFE), but other plastic material suitable for food processing and possible to be coated can be used as well. Further, the coating can also protect the elastic material against the cleaning agents used during cleaning and also against abrasive products.

In order to provide for that the elastic properties of the main body 502 is not lost the coating 504 is preferably made thin, e.g. 0.5 mm. However, since different material have different properties the thickness of the coating may differ for different material.

It should be noted that FIGS. 5a and 5b are mainly for illustrative purposes. In real applications, a difference between the first mode and the second mode may be less significant.

Figure 6A:
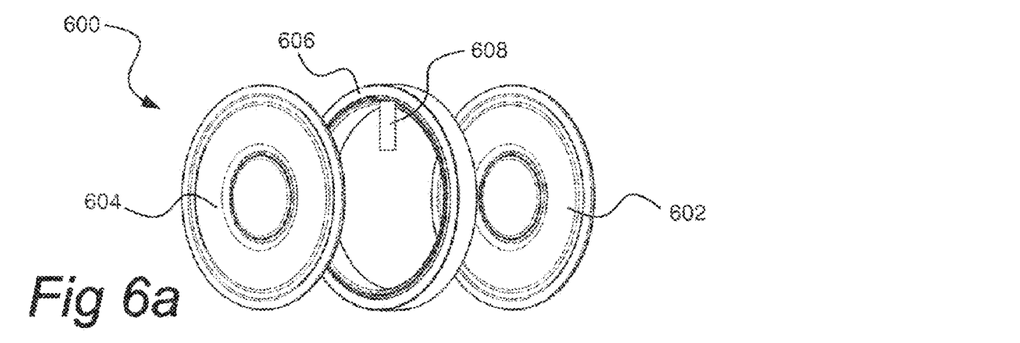
FIGS. 6a, 6b and 6c illustrate a membrane module.
Figure 6B:
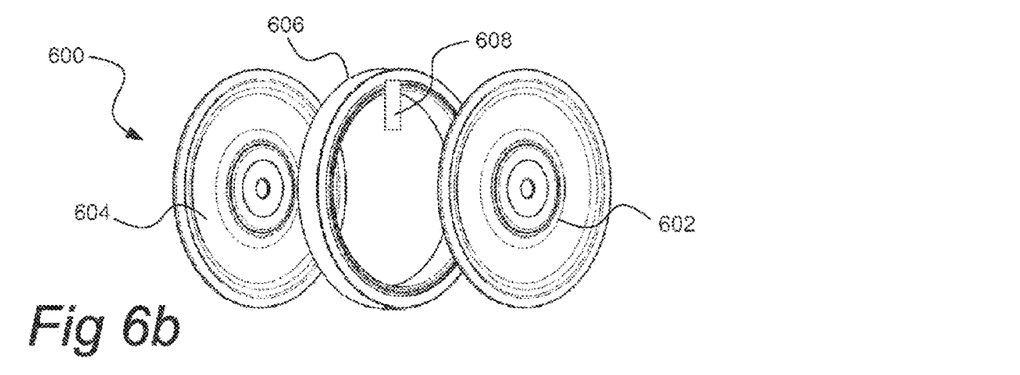
Figure 6C:
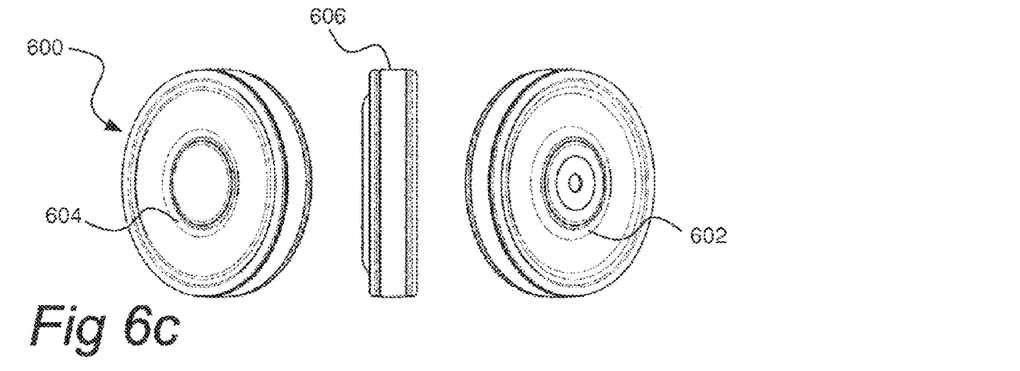

FIG. 6a, 6b illustrate a membrane module 600 comprising a first membrane 602, a second membrane 604, a membrane ring 606 and a sensor 608 in an exploded view from two different perspectives. FIG. 6c illustrates the membrane module when the first and second membrane are attached to the membrane ring 606. As illustrated, both membranes may be of the kind illustrated in FIGS. 4, 5a and 5b.

By connecting the first membrane 602 and the second membrane 604 to each other in this way a closed space is formed, herein referred to as the membrane interior space. In this closed space the marker liquid can be held, thereby making it possible to easily replace one membrane module by another.

The sensor 608, that may be a conductivity sensor as explained above, can be placed in the membrane interior space. Although not illustrated, sensor connection elements may be provided on an outer side of the membrane ring such that data collected by the sensor 608 can be captured and transmitted to a control device or the like configured for analyzing data in order to detect if one or more properties of the marker liquid has been changed, e.g. due to that the first membrane has ruptured and that hydraulic oil has entered the membrane interior space.

Figure 7A:
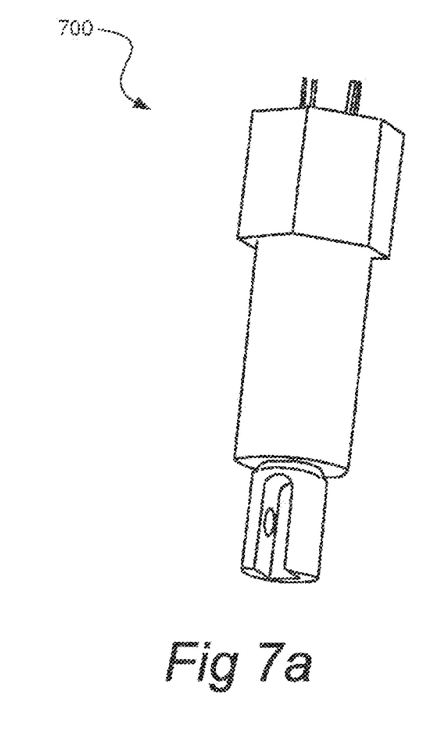
FIGS. 7a and 7b illustrate an example of a conductivity sensor.

FIG. 7a illustrates an example of a conductivity sensor withstanding a high pressure such that it can be placed in the membrane interior space.

Figure 7B:
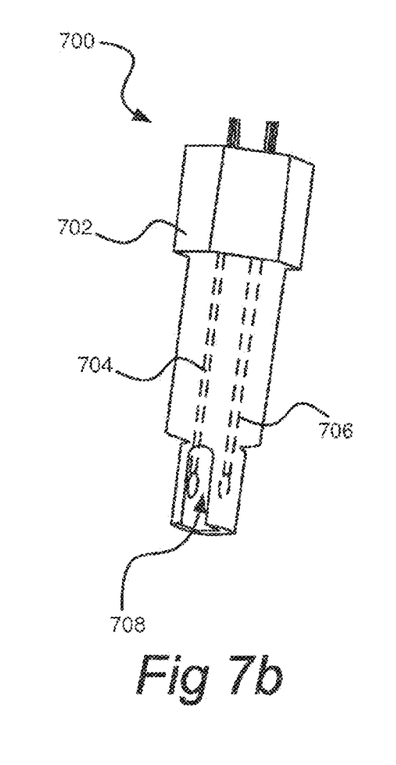

The conductivity sensor 700 is further illustrated in FIG. 7b. In this example, a body 702 can be arranged for holding a first electrode 704 and a second electrode 706. In a space 708, the marker liquid can be placed such that a conductivity can be measured by using the first electrode 704 and the second electrode 706.

In order to find out if hydraulic oil, product or cleaning agents, sometimes also referred to as cleaning in place (CIP) media, in the marker liquid can be detected, and hence in turn a membrane rupture, different tests have been performed.

Figure 8:
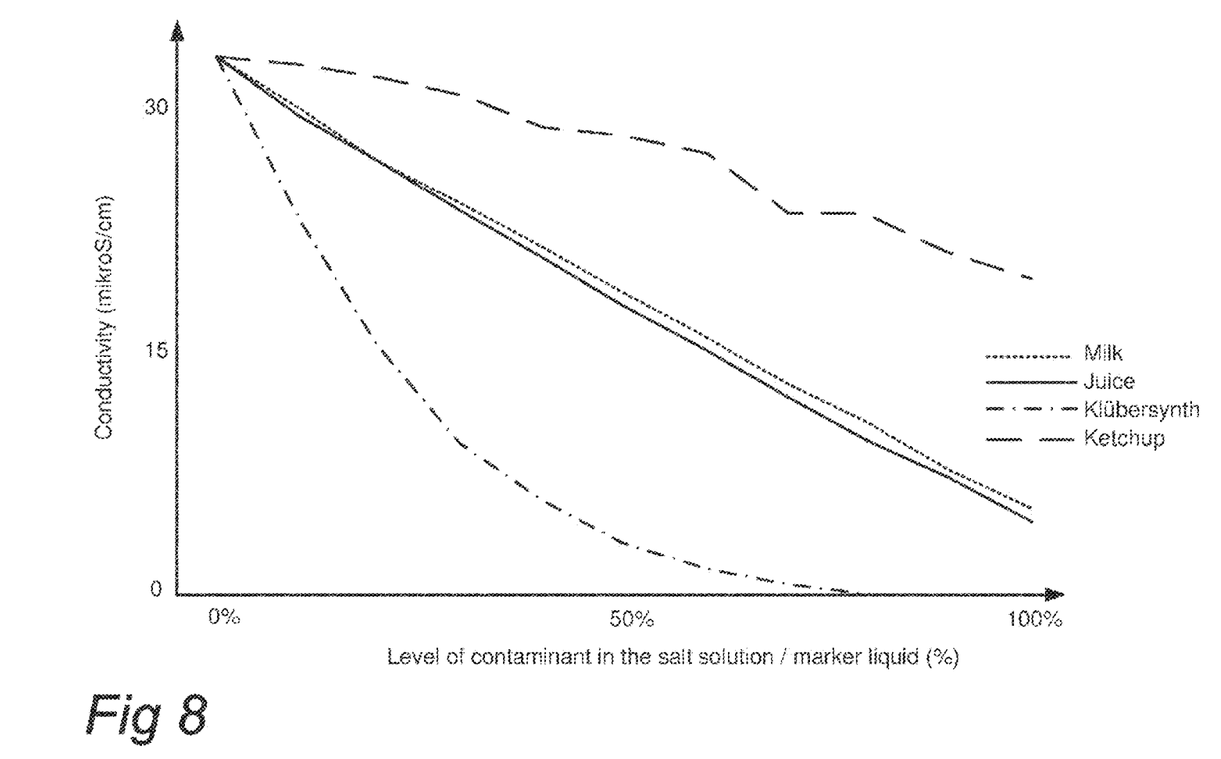
FIG. 8 illustrates a diagram presenting a relationship between conductivity and level of contaminant for a number of products and hydraulic oil.

FIG. 8 illustrates a diagram from one of these tests showing results for different products, more particularly, milk, juice, hydraulic oil (Klübersynth) and ketchup, with the marker liquid being salt water, more particularly salt water with 2% salt. The conductivity measured in µS/cm was compared to the level of contaminant, i.e. product or oil, in the salt water in percentage.

As can be seen from the diagram, milk and juice display a more or less linear relationship between conductivity and level of contaminant. Further, the decrease in conductivity is clear and it would therefore be possible to detect with a conductivity sensor.

The hydraulic oil (Klübersynth in this test) also shows a clear drop in conductivity, which makes it possible to also detect hydraulic oil with the conductivity sensor.

Ketchup, which has a salt content that is higher than the salt content of milk or juice, does not show the same drop in conductivity and will hence be more difficult to detect using the conductivity sensor, even though it will be possible if using a high end sensor. Alternatively or in combination, in order to improve the capabilities of detecting product in the marker liquid, a marker liquid with a lower salt content may be chosen leading to a larger difference in conductivity between the product and the marker liquid, thereby making it easier to detect if product has been mixed with the marker liquid. The same approach could be used for other products with a high salt content, such as sport drinks.

A challenge with having the sensor placed in the membrane interior space is the high pressure. In a homogenizer of today it is common to increase the pressure from 300 kPa (3 bar) to 10-25 MPa (100-250 bar). Even if this can be overcome it adds an extra cost to the sensor and therefore alternative ways for measuring may be of interest.

Figure 9:
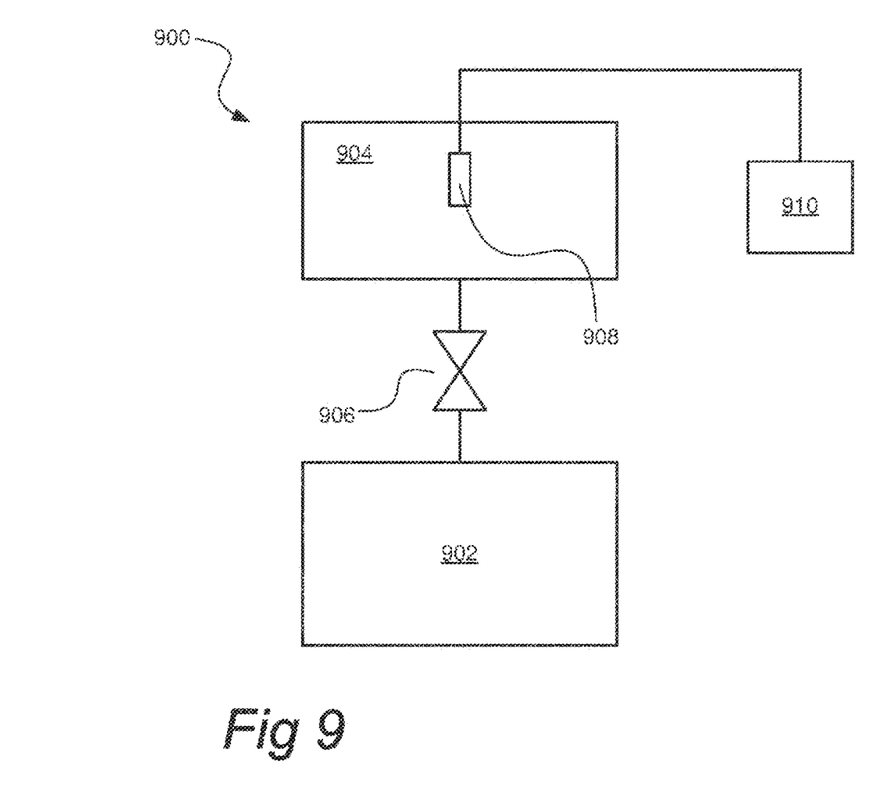
FIG. 9 schematically illustrates a sampling sensor system.

FIG. 9 illustrates a so-called sampling sensor system 900 that can be used as an alternative to an in-line sensor illustrated in FIGS. 7a and 7b. Further, if measuring more than one property of the marker liquid, it is possible to detect one of the measure by using an in-line sensor and another measure by the sampling sensor system. Still an option is to use the sensor in the membrane interior space as the first sensor registering data continuously and to use the sampling sensor system as a back-up sensor system or for making additional measurements.

The sampling sensor system 900 can comprise a membrane module 902 provided with a channel leading to a low pressure sampling chamber 904. In order to make sure that the high pressure in the membrane module 902 can be kept a valve 906 may be provided on the channel.

In the low pressure sampling chamber 904 a sensor 908 can be arranged for registering one or more properties of the marker liquid fed from the membrane module 902 via the channel. In turn, the sensor 908 may be connected to a control device 910, such as a computer, for analyzing the sensor output.

Figures 10A, 10B, 10C:
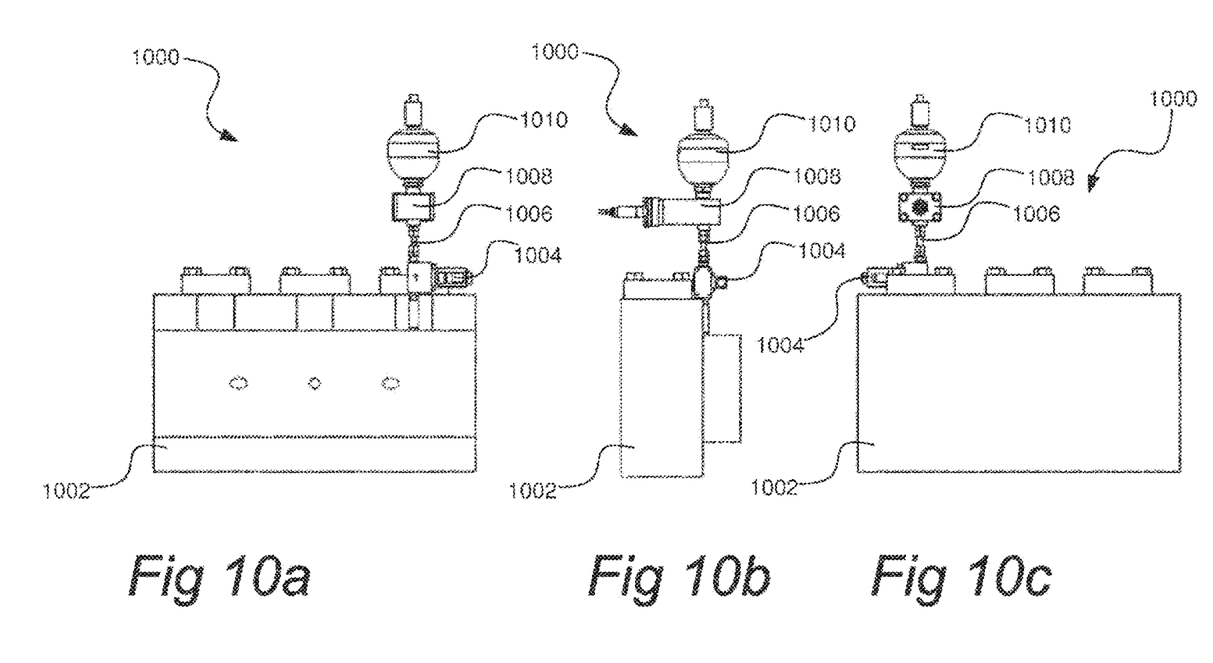
FIGS. 10a, 10b and 10c illustrates an example set up of a sampling sensor system.

FIGS. 10a, 10b and 10c illustrate different perspective views of an example set up of a sampling sensor system 1000. In this example set up, on top of a pump block 1002, a valve 1004 and a conduit 1006 a low pressure sampling chamber 1008 is provided. Further, an accumulator 1010 can be used for soaking up part of the marker liquid, which in this particular example has been chosen to be a gel. After having made a measurement the marker liquid can be pushed down into the membrane interior space again.

FIG. 11 illustrates a schematic view of an example set up of a part of a food processing system 1100. In this example, a separator 1102 is placed upstream a piston pump arrangement 1104 and a spray dryer 1106 is placed downstream said piston pump arrangement 1104. Optionally, a heat treatment station 1108, a dearator 1110 or other pieces of equipment may be part of the system as well.

The piston pump arrangement 1104 can be provided with a membrane 1112 providing for that product is kept separated from hydraulic oil placed in a hydraulic oil chamber 1114. By having the hydraulic oil the pressure formed by a piston 1116, or several pistons, can be forwarded to the membrane 1112 as described above.

If a sudden pressure increase enter the product chamber of the piston pump arrangement 1104, e.g. when the separator 1102 discharges or when a blockage occur in the spray dryer 1106, this pressure increase will be spread to the hydraulic oil chamber 1114 via the membrane 1112. By opening a pressure relief valve 1118 the pressure increase may be reduced by releasing hydraulic oil from the hydraulic oil chamber 1114 to a container 1120. In this way the pressure increase, or pressure peak, may be eliminated without product losses, which would be the case if a line pressure relief valve was used, i.e. a pressure relief valve placed, for instance, on a pipe between the piston pump arrangement 1104 and the spray dryer 1106.

Since the hydraulic oil is fed to the container 1120 this may be re-entered to the hydraulic oil chamber 1114, and hence the hydraulic oil can be re-used, which of course is a benefit from both economical and environmental standpoint.

Apart from the advantage of less product losses, having pressure relief valve 1118 as described will also improve safety in food processing plants. As soon as the pressure in the hydraulic chamber is above a set threshold, e.g. due to a blocked nozzle in the spray dryer, the pressure in the hydraulic oil chamber is reduced and the pistons will thereby not increase the pressure additionally.

Still an advantage is that the wear on the gearbox and other parts of the piston pump arrangement will be reduced with the pressure relief valve.

Sometimes, the word "diaphragm" is used instead of "membrane". In this text no difference has been made between these two words, and they should in this context both be understood as an elastic structure capable of keeping two fluids apart.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A homogenizer comprising:
    a homogenizing device, configured to homogenize a product; and
    a pump block, the pump block comprising:
        a first membrane possessing a periphery,
        a second membrane, the first and second membranes being spaced apart so that a membrane interior space exists between the first and second membranes,
        a marker liquid in the membrane interior space,
        the first membrane including a raised section positioned between the periphery of the first membrane and a centrally located mid-section of the first membrane, and
        the centrally located mid-section of the first membrane being strengthened by a strengthening portion incorporated into the first membrane.

2. The homogenizer according to claim 1, wherein said marker liquid is a conductive solution.

3. The homogenizer according to claim 2, wherein said conductive solution is salt water.

4. The homogenizer according to claim 1, further comprising a membrane ring connecting said first membrane and said second membrane to each other such that said membrane interior space is formed, wherein said membrane interior space is configured to hold said marker liquid.

5. The homogenizer according to claim 1, further comprising a sensor configured to register at least one property of said marker liquid.

6. The homogenizer according to claim 5, wherein said sensor is configured to register conductivity.

7. The homogenizer according to claim 5, wherein said sensor is placed in said membrane interior space.

8. The homogenizer according to claim 1, wherein said second membrane comprises a main body having a first side and a second side, wherein said main body is made of an elastic material, wherein said second side is provided with a plastic coating.

9. The homogenizer according to claim 8, wherein said elastic material is rubber.

10. The homogenizer according to claim 9, wherein said rubber is ethylenepropylenedienemonomer (EPDM).

11. The homogenizer according to claim 8, wherein said plastic coating is polytetrafluoroethylene (PTFE).

12. The homogenizer according to claim 1, further comprising a pressure relief valve connected to a hydraulic oil chamber.

13. A processing line comprising the homogenizer according to claim 1.

14. A homogenizer comprising:
    a homogenizing device configured to homogenize a product;
    a hygienic product chamber;
    a piston operable to increase pressure in the hygienic product chamber and pressurize the product; and
    a membrane module positioned between the piston and the hygienic product chamber to separate the hygienic product chamber on one side of the membrane module from a non-hygienic side of the membrane module in which the piston is located, the membrane module comprising:
        a membrane ring that is annular in shape surrounding a centrally located through opening that includes a center of the membrane ring,
        a first membrane possessing a periphery attached to the membrane ring,
        a second membrane possessing a periphery attached to the membrane ring, the first and second membranes being spaced apart so that a membrane interior space is bounded by an inner periphery of the membrane ring and the first and second membranes,
        a marker liquid in the membrane interior space,
        the first membrane including a raised section positioned between the periphery of the first membrane and a centrally located mid-section of the first membrane, the centrally located mid-section of the first membrane being strengthened by a strengthening portion incorporated into the first membrane, and
        the second membrane including a raised section positioned between the periphery of the second membrane and a centrally located mid-section of the second membrane, the centrally located mid-section of the second membrane being strengthened by a strengthening portion incorporated into the second membrane.

15. The homogenizer according to claim 14, further comprising a conductivity sensor extending inwardly into the membrane interior space from the membrane ring.

16. The homogenizer according to claim 15, wherein the conductivity sensor comprises a body holding a first electrode and a second electrode.

* * * * *